(12) United States Patent
Clark et al.

(10) Patent No.: US 9,661,147 B2
(45) Date of Patent: May 23, 2017

(54) METHOD, SYSTEM AND APPARATUS FOR INTELLIGENTLY HANDLING A REQUEST FOR A COMMUNICATION SESSION

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BCE Inc., Verdun (CA)

( * ) Notice: Subject to any disclaimer, the term of this patent is extended or adjusted under 35 U.S.C. 154(b) by 1373 days.

(21) Appl. No.: 11/993,616

(22) PCT Filed: Dec. 19, 2006

(86) PCT No.: PCT/CA2006/002072
§ 371 (c)(1),
(2), (4) Date: Dec. 21, 2007

(87) PCT Pub. No.: WO2008/074118
PCT Pub. Date: Jun. 26, 2008

(65) Prior Publication Data
US 2010/0074247 A1 Mar. 25, 2010

(51) Int. Cl.
*H04L 12/66* (2006.01)
*H04M 7/00* (2006.01)
*H04M 3/46* (2006.01)

(52) U.S. Cl.
CPC .......... *H04M 7/006* (2013.01); *H04M 3/465* (2013.01); *H04M 2203/2044* (2013.01)

(58) Field of Classification Search
CPC ................. H04M 3/465; H04M 7/006; H04M 2203/2044
(Continued)

(56) References Cited

U.S. PATENT DOCUMENTS 4,935,955 A   6/1990   Neudorfer
5,999,965 A   12/1999  Kelly
(Continued)

FOREIGN PATENT DOCUMENTS

EP   0 641 112 A2       3/1995
WO   WO 02/056568 A2    7/2002
(Continued)

OTHER PUBLICATIONS

Office Action issued by the United States Patent and Trademark Office on Dec. 22, 2010 in connection with U.S. Appl. No. 11/993,429, 28 pages.
(Continued)

*Primary Examiner* — Luat Phung
(74) *Attorney, Agent, or Firm* — Gowling WLG (Canada) LLP

(57) ABSTRACT

According to embodiments of the present invention, there is provided a method, system and apparatus for handling a request for a communication session. The method comprises receiving, at a processing time, a request for a communication session, the request comprising a destination network identifier, the destination network identifier having been registered in association with a plurality of communication clients; the request having been originated by an originating party associated with an originating identifier. The method further comprises identifying, based on at least one of the originating network identifier and the processing time, a subset of the plurality of communication clients. The method further comprises delivering the request to the subset of the plurality of communication clients.

92 Claims, 5 Drawing Sheets

(58) Field of Classification Search
USPC ............ 379/142.01–142.07, 201.01, 201.02, 379/207.03, 207.15, 211.02–211.04; 370/352–356
See application file for complete search history.

(56) References Cited

U.S. PATENT DOCUMENTS

| | | | |
|---|---|---|---|
| 6,473,501 | B1 | 10/2002 | Paulsrud |
| 7,369,538 | B1 | 5/2008 | Ehlinger et al. |
| 7,496,625 | B1 | 2/2009 | Belcher et al. |
| 7,822,188 | B1 | 10/2010 | Kirchhoff et al. |
| 7,881,455 | B2 * | 2/2011 | Wolter et al. ............ 379/355.02 |
| 2003/0041048 | A1 * | 2/2003 | Balasuriya ........................ 707/1 |
| 2003/0048892 | A1 * | 3/2003 | Murai ........................... 379/242 |
| 2003/0179743 | A1 | 9/2003 | Bosik et al. |
| 2003/0194078 | A1 * | 10/2003 | Wood et al. .................. 379/224 |
| 2004/0233892 | A1 | 11/2004 | Roberts et al. |
| 2005/0259667 | A1 | 11/2005 | Vinokurov et al. |
| 2007/0064886 | A1 | 3/2007 | Chiu et al. |
| 2007/0079005 | A1 | 4/2007 | Jasen et al. |
| 2007/0243870 | A1 | 10/2007 | Bantukul |
| 2007/0282911 | A1 | 12/2007 | Bantukul et al. |
| 2007/0286202 | A1 | 12/2007 | Dos Remedios et al. |
| 2007/0286391 | A1 * | 12/2007 | Gibson .................... 379/211.02 |
| 2008/0253543 | A1 | 10/2008 | Aharon |
| 2009/0097626 | A1 | 4/2009 | McMurry et al. |
| 2009/0103519 | A1 | 4/2009 | Grothe |
| 2011/0255671 | A1 | 10/2011 | Madhavapeddi et al. |
| 2012/0195305 | A1 | 8/2012 | Chavda et al. |
| 2013/0229950 | A1 | 9/2013 | Bjorsell et al. |

FOREIGN PATENT DOCUMENTS

| | | |
|---|---|---|
| WO | WO 2004/031902 A2 | 4/2004 |
| WO | WO 2004/066604 A1 | 8/2004 |
| WO | PCT/CA2006/002072 | 8/2007 |
| WO | PCT/CA2006/002074 | 8/2007 |

OTHER PUBLICATIONS

Non-Final Office Action issued by the United States Patent and Trademark Office on Mar. 11, 2013 in connection with U.S. Appl. No. 11/993,429, 30 pages.

Office Action issued on Oct. 1, 2013 in connection with U.S. Appl. No. 11/993,429, 25 pages.

* cited by examiner

Client Mapping 200

| Identifier | Address | Sub-address | Allowed List | Time |
|---|---|---|---|---|
| 4162223333@serviceprovider.com | 64.230.200.100 | $110a_1$ | <416.555.0001><br><416.555.0002><br><416.555.0003> | <empty> |
| 4162223333@serviceprovider.com | 64.230.200.100 | $110a_2$ | <empty> | <empty> |
| 4162223333@serviceprovider.com | 64.230.200.100 | $110a_3$ | <416.555.0006><br><416.555.0007> | <8:30-16:30> |
| 4162223333@serviceprovider.com | 64.230.200.100 | $110a_3$ | <empty> | <16:31-08:29> |
| 4165556666@serviceprovider.com | 64.230.200.101 | 5060 | <empty> | <empty> |

FIG. 2A

METHOD, SYSTEM AND APPARATUS FOR INTELLIGENTLY HANDLING A REQUEST FOR A COMMUNICATION SESSION

FIELD OF THE INVENTION

This invention relates to the field of telecommunications in general and, more specifically, to a method, system and apparatus for intelligently handling a request for a communication session.

BACKGROUND OF THE INVENTION

A typical telephony subscriber installs a plurality of telephones in his or her household. For example, s/he may install telephones in various rooms of the household to enable easy reach of the telephone in the case s/he or other members of the household need to answer an incoming call or need to make an outgoing call irrespective of their location within the household. Typically, no matter how many telephones the subscriber has installed in the household, they are all associated with a single telephone number and a single telephone line that the subscriber subscribes to and pays for. Within a typical household, some members of the household are more likely to effect their voice communications in a certain part of the household. For example, a member of the household who runs her home-based business is more likely to handle her business-related voice communications from a home office phone. A teenager is more likely to effect his voice communications from his bedroom.

Effectively managing incoming calls can be a challenge, especially in a household with more than two members, as the number of incoming calls usually increases with the number of household members. Service providers have made several attempts to rectify the problem. One prior art solution involves displaying Caller Line ID (CLID) information associated with a calling party on a CLID-enabled display of one or more telephones installed in the household. The CLID information is meant to enable the subscriber (or another member of the household) to screen the incoming call to (a) decide how to dispose of the incoming call (ex. answer the incoming call, ignore the incoming call, etc.) and (b) attempt to determine which member of the household the incoming call is destined for. Another prior art solution is commonly referred to as "distinctive ringing". Within the feature, the subscriber (or other members of the household) can provision his or her telephone number with a list of priority callers. When an incoming call is originated by one of these priority callers, the incoming call is announced with distinctive ringing to signify that the caller who originated the incoming call is one of the priority callers.

These prior art solutions still suffer from certain shortcomings and still may cause inconvenience to the subscriber (or other members of the household). For example, with the CLID announcement feature, the following shortcoming has been identified. Unless each of the telephones within the household is equipped with the CUD-enabled display, when an incoming call is announced at the household, the subscriber (or other members of the household) would have to run to those telephones that are equipped with the CLID-enabled display to ascertain who the originator of the incoming call is. On the other hand, the problem with the distinctive ringing solution is that it is provisioned on a per-telephone-number basis. Accordingly, in those households where multiple members of the household reside, a single list of priority callers that all members of the household agree on has to be provisioned. Within this scenario, the distinctive ringing feature may very quickly lose its meaning, as members of the household will no longer be able to ascertain whether a particular originator of a particular incoming call is "their" priority caller or not.

Therefore, there remains a need for more effective means for managing incoming calls.

SUMMARY OF THE INVENTION

According to a first broad aspect of the present invention, there is provided a method. The method comprises receiving, at a processing time, a request for a communication session, the request comprising a destination network identifier, the destination network identifier having been registered in association with a plurality of communication clients; the request having been originated by an originating party associated with an originating identifier. The method further comprises identifying, based on at least one of the originating identifier and the processing time, a subset of the plurality of communication clients. The method further comprises delivering the request to the subset of the plurality of communication clients.

According to a second broad aspect of the present invention, there is provided an apparatus. The apparatus comprises means for receiving, at a processing time, a request for a communication session, the request comprising a destination network identifier, the destination network identifier having been registered in association with a plurality of communication clients; the request having been originated by an originating party associated with an originating identifier. The apparatus further comprises means for identifying, based on at least one of the originating identifier and the processing time, a subset of the plurality of communication clients. The apparatus further comprises means for delivering the request to the subset of the plurality of communication clients.

According to a third broad aspect of the present invention, there is provided a system. The system comprises a network element operable to receive, at a processing time, a request for a communication session, the request comprising a destination network identifier, the destination network identifier having been registered in association with a plurality of communication clients; the request having been originated by an originating party associated with an originating identifier. The network element is further operable to identify, based on at least one of the originating identifier and the processing time, a subset of the plurality of communication clients. The network element is further operable to deliver the request to the subset of the plurality of communication clients.

According to yet another broad aspect of the present invention there is provided a computer-readable medium comprising computer-readable program code which, when executed by a computing apparatus, causes the computing apparatus:

receive, at a processing time, a request for a communication session, the request comprising a destination network identifier, the destination network identifier having been registered in association with a plurality of communication clients; the request having been originated by an originating party associated with an originating identifier;

identify, based on at least one of the originating identifier and the processing time, a subset of the plurality of communication clients;

deliver the request to the subset of the plurality of communication clients.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIGS. 2A and 2B are diagrams representing non-limiting embodiments of a client mapping maintained by a network element of FIG. 1;

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
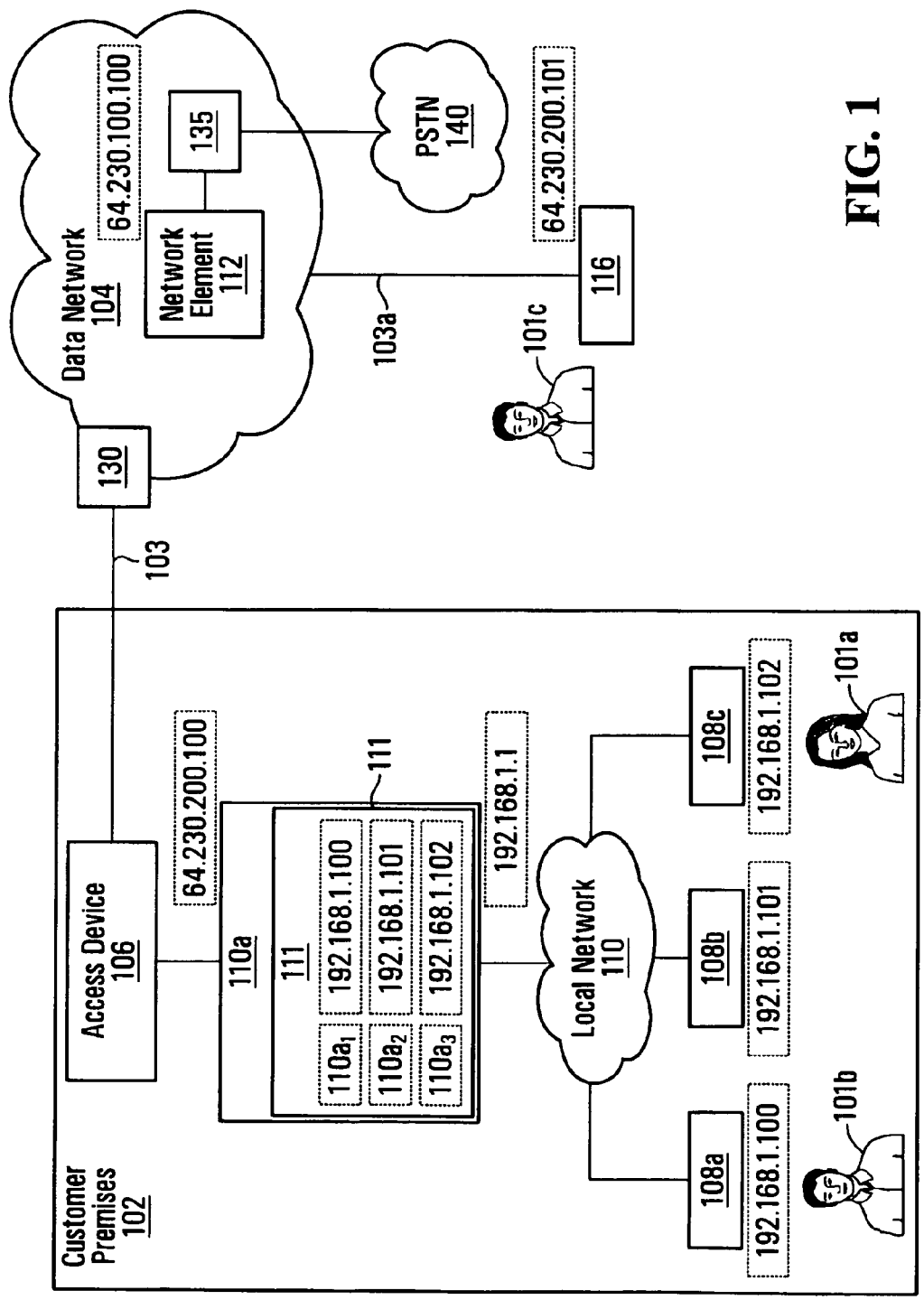
FIG. 1 is a diagram representing various components of a non-limiting embodiment of an infrastructure for intelligently handling a request for a communication session.

FIG. 1 shows various components of an infrastructure for intelligently handling a request for a communication session. The infrastructure comprises a customer premises 102 associated with a user 101a. The customer premises 102 may be further associated with a user 101b residing thereat. For the purposes of the example to be presented herein below, it is to be assumed that the user 101a is a subscriber to a telephony service at the customer premises 102. The customer premises 102 can be coupled to a data network 104 via an access connection 103. The customer premises 102 may comprise, but is not limited to, a house, a unit in a multi-dwelling unit (MDU), an office, etc. The data network 104 may comprise any data network suitable for satisfying communication needs of user(s) at the customer premises 102 (such as, for example, the users 101a, 101b). These communication needs may include exchanging data, entertainment, telephony and the like. In a specific non-limiting embodiment of the present invention, the data network 104 can comprise the Internet. However, in alternative non-limiting embodiments of the present invention, the data network 104 may comprise another type of a public data network, a private data network, portions of the Public Switched Telephone Network (PSTN), a wireless data network and the like.

In an example non-limiting embodiment of the present invention, the access connection 103 can be a copper twisted pair, over which higher-layer protocols allow for the exchange of packets (ex. an xDSL-based access link). In an alternative non-limiting embodiment, the access connection 103 may comprise an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, and the like), coaxial cable link, etc., or a combination thereof. Generally speaking, the access connection 103 may comprise any type of wireless, wired or optical connection that allows exchange of data between the customer premises 102 and the data network 104.

It should be noted that even though its depiction in FIG. 1 is greatly simplified, the data network 104 may comprise a number of network elements for facilitating exchange of data. For example, in the above-mentioned scenario where the access connection 103 is the xDSL-based link, the data network 104 may comprise a number of Digital Subscriber Line Access Multiplexers (DSLAMs), Outside Plant Interface DSLAMs (OPI-DSLAMs), edge routers, etc. In the above-mentioned scenario where the access connection 103 is the cable link, the data network 104 may comprise a number of cable headends, distribution hubs, etc. As a non-limiting example of these network elements, a DSLAM 130 has been depicted in FIG. 1. Persons skilled in the art will readily appreciate various configurations possible for the network elements that make up the data network 104 and, as such, these network elements need not be described here in great detail.

The customer premises 102 may comprise an access device 106 that facilitates exchange of data with the data network 104 via the access connection 103. In some embodiments of the present invention, the access device 106 may comprise a modem. Examples of modems that can be used include, but are not limited to, a cable modem, an xDSL modem and the like. In alternative embodiments of the present invention, which are particularly applicable where the access connection 103 comprises Fiber-to-the-premise, the access device 106 may comprise an Optical Network Terminal (ONT). Naturally, the type of the access device 106 will depend on the type of the access connection 103 employed.

The customer premises 102 may comprise a number of communication clients coupled to the access device 106. Only three communication clients are depicted: a communication client 108a, a communication client 108b and a communication client 108c. Generally speaking, communication clients 108a, 108b and 108c can be implemented in hardware, software, firmware or a combination thereof. For the purposes of various examples to be presented herein below, the following non-limiting assumptions will be made:

the communication client 108a comprises a VoIP phone located in a bedroom associated with the user 101b;
the communication client 108b comprises a VoIP phone located in a family room of the customer premises 102;
the communication client 108c comprises a computing apparatus executing a soft client located in a home office of the customer premises 102, the home office associated with the user 101a who runs her business from the customer premises 102.

It should be understood that the customer premises 102 may comprise a number of additional communication clients that may include, but are not limited to, other VoIP phones, a wireless VoIP phone (such as, for example, a J2ME wireless phone), a Plain Old Telephone System (POTS) phone equipped with an Analog Terminal Adapter (ATA), other computing apparatuses executing soft clients, a set-top box, a gaming device, a security system and the like. The number of communication clients installed within the customer premises 102 is not limited other than by business considerations of a service provider who manages the access connection 103. Put another way, the customer premises 102 may comprise two or more communication clients similar to the communication clients 108a, 108b, 108c.

In some embodiments of the present invention, the communication clients 108a, 108b and 108c may be coupled directly to the access device 106. However, in the specific non-limiting embodiment depicted in FIG. 1, the communication clients 108a, 108b and 108c are coupled to the access device 106 via a local data network 110. In some non-limiting embodiments of the present invention, the local data network 110 may comprise an Ethernet-based network. In another non-limiting embodiment of the present invention, the local data network 110 may comprise a wireless network (ex. a Wi-Fi based network, a Wi-Max based network, BlueTooth® based network and the like). It should be noted that any other type of local data network 110 or a combination of the example networks can be used. In some of these embodiments, the local data network 110 may comprise a home gateway 110a that mediates communication between the communication clients 108a, 108b and 108c and the access device 106. The home gateway 110 may comprise a wireless router, a wired router or a combined wireless/wired router.

In some non-limiting embodiments of the present invention, the functionality of the access device 106 and the home gateway 110a may be embodied in a single device. In other non-limiting embodiments of the present invention, the functionality of the access device 106 and/or the home gateway 110a may be integrated into one of the communication clients 108a, 108b, 108c. In yet further alternative non-limiting embodiments of the present invention, the home gateway 110a and the local data network 110 can be omitted from the infrastructure of FIG. 1. This is particularly applicable in those non-limiting embodiments where the communication clients 108a, 108b or 108c are coupled to the access device 106 directly and, as such, the local data network 110 and the home gateway 110a can be omitted. Yet in other alternative non-limiting embodiments of the present invention, some of the communication clients 108a, 108b and 108c (as well as other communication clients potentially located within the customer premises 102, but omitted from the infrastructure of FIG. 1 for the sake of simplicity) may be coupled directly to the access device 106, while others of the communication clients 108a, 108b and 108c (as well as other communication clients potentially located within the customer premises 102, but omitted from the infrastructure of FIG. 1 for the sake of simplicity) may be coupled to the access device 106 via the local data network 110 and the home gateway 110a.

It should be understood that the infrastructure of FIG. 1 may comprise a number of additional communication clients outside of the customer premises 102, coupled to the data network 104. As a non-limiting example only, the infrastructure of FIG. 1 may comprise a communication client 116 associated with another user (such as, for example, a user 101c). The communication client 116 can be coupled to the data network 104 via an access connection 103a. The communication client 116 may comprise one or more of a VoIP phone, a POTS phone equipped with an Analog Terminal Adapter (ATA), a computing apparatus executing a soft client, a set-top box, a gaming device, a security system and the like. The access connection 103a may be substantially similar to the access connection 103. However, it should be understood that the access connection 103 and the access connection 103a need not be of the same type in every embodiment of the present invention. For example, in some non-limiting embodiments of the present invention, the access connection 103 may comprise an xDSL-based link, while the access connection 103a may comprise a Fiber-to-the-Premise based link. Naturally, a myriad of other non-limiting combinations of how the access connections 103, 103a can be implemented are possible.

For the purposes of establishing communication sessions and terminating communication sessions between, for example, one of the communication clients 108a, 108b, 108c and another communication client (such as, for example, the communication client 116) via the data network 104, the data network 104 may comprise a network element 112. The network element 112 is sometimes referred to in the industry as a "soft switch" and comprises circuitry, software and/or control logic for providing various communication features to VoIP clients (such as, for example, the VoIP clients 108a, 108b, 108c and 116) coupled to the data network 104. Examples of such communication features include (i) connecting incoming calls to the communication clients (such as, for example, the communication clients 108a, 108b, 108c and 116); and (ii) handling outgoing calls originated from the communication clients (such as, for example, the communication clients 108a, 108b, 108c and 116). Other examples of communication features that can be performed by the network element 112 can include but are not limited to call waiting, call forwarding, and so on.

In some embodiments of the present invention, the network element 112 may further comprise circuitry, software and/or control logic for performing at least one of the following functions: synthesizing voice messages, providing audio mixing capabilities, receiving a selection from users of communication clients, receiving and interpreting speech utterances, detecting DTMF tones, determining the current time and the like. In an alternative non-limiting embodiment of the present invention, some or all of these additional functions may be performed by one or more devices (not depicted) connected to and under control of the network element 112. Furthermore, among other functions performed by the network element 112, the network element 112 can maintain an active call table (not depicted) which logs all active communication sessions maintained by all communication clients registered to the network element 112 (such as, for example, the communication clients 108a, 108b, 108c and 116).

In addition, the network element 112 can comprise suitable circuitry, software and/or control logic for exchanging calls with entities outside the data network 104. This is particularly convenient, when a call is placed by the user of one of the communication clients that the network element 112 serves (i.e. a user 101a of one of the communication clients 108a, 108b, and 108c or the user 101c of the communication client 116) to a telephone number that is reachable via the Public Switched Telephone Network (PSTN), which is depicted at 140 in FIG. 1. In an alternative non-limiting embodiment of the present invention, the infrastructure of FIG. 1 may comprise a separate gateway 135 for mediating the communication flow between the data network 104 and the PSTN 140.

A non-limiting example of the network element 112 can be embodied in a MCS 5200 Soft Switch manufactured by Nortel Networks Ltd. of 8200 Dixie Road, Brampton, Ontario L6T 5P6, Canada. However, it should be expressly understood that the network element 112 can have various other configurations.

For the purposes of facilitating exchange of data via the data network 104, the home gateway 110a may be assigned a network address compatible with an addressing scheme of the data network 104. In some embodiments of the present inventions, the network address can comprise an IPv4 address. In an alternative embodiment of the present invention, the network address can comprise an IPv6 address. In an alternative non-limiting embodiment of the present invention, the network address can comprise any other suitable type of a unique identifier, such as, for example, a media access control (MAC) address, a proprietary identifier and the like.

How the home gateway 110*a* is assigned a network address is not particularly limited. For example, in some non-limiting embodiments of the present invention, the home gateway 110*a* may be assigned a static network address. This static network address may be assigned to the home gateway 110*a* before the home gateway 110*a* is shipped to the customer premises 102, during an initial registration process or at another suitable time. In another non-limiting embodiment of the present invention, the home gateway 110*a* may be assigned a dynamic network address. For example, in a non-limiting scenario, a Dynamic Host Configuration Protocol (DHCP) server (not depicted) may be used to assign the dynamic network address (such as, for example, a dynamic IP address) to the home gateway 110*a*. In alternative non-limiting embodiments of the present invention, the home gateway 110*a* can obtain its network address by establishing a PPPoE session with a provisioning server (not depicted). Other alternative implementations are, of course, possible. In an alternative non-limiting embodiment of the present invention, which is particularly applicable in a scenario where the home gateway 110*a* is omitted, the access device 106 may be assigned a network address.

Each of the communication clients 108*a*, 108*b* and 108*c* can also be assigned a respective network address for the purposes of receiving and transmitting data via the home gateway 110*a*, the access device 106 and the data network 104. Several non-limiting embodiments as to how the network addresses of the communication clients 108*a*, 108*b* and 108*c* can be assigned are envisioned:

Public Network Addresses

In some embodiments of the present invention, the communication clients 108*a*, 108*b* and 108*c* can be assigned network addresses that are routable or, in other words, are visible to the data network 104 and other devices connected thereto (such as, for example, the network element 112, the communication client 116). The routable network addresses are sometimes also referred to as "global" or "public" network addresses. For example, if the data network 104 implements an IPv6 address scheme, it is envisioned that each of the communication clients 108*a*, 108*b* and 108*c* may be assigned a unique public IP address. In some of these non-limiting embodiments, there may be no need for the local data network 110 and/or the home gateway 110*a*.

Private Network Addresses

In other embodiments of the present invention, each of the communication clients 108*a*, 108*b* and 108*c* can be assigned what is called a "non-routable", "local" or "private" network address. In these non-limiting embodiments, the private network addresses are used for the purposes of identifying the communication clients 108*a*, 108*b* and 108*c* within the local data network 110, while communication outside of the local data network 110 is implemented by using the aforementioned public network address assigned to the home gateway 110*a* (or, in some cases, the access device 106). In some non-limiting embodiments of the present invention, the home gateway 110*a* may be responsible for assigning private network addresses to the communication clients 108*a*, 108*b* and 108*c*. However, this need not be the case in every embodiment of the present invention. For example, the private network addresses can be assigned to the communication clients 108*a*, 108*b* and 108*c* by a dedicated address server (not depicted) coupled to the local data network 110 or to the data network 104.

In the specific non-limiting example depicted in FIG. 1, each of the communication clients 108*a*, 108*b* and 108*c* can be assigned a private network address by the home gateway 110*a*. For the sole purpose of simplifying the description to be presented herein below, it is assumed that both the private and the public network addresses are Internet Protocol (IP) addresses assigned according to the IPv4 protocol. However, it is expected that one of ordinary skilled in the art will easily adapt the teachings to be presented herein below to other addressing schemes.

Accordingly, the home gateway 110*a* may be assigned two IP addresses: a first IP address for the purposes of communicating with devices on the data network 104 (i.e. a so-called "network facing interface" IP address) and a second IP address for the purposes of communicating with devices on the local data network 110 (i.e. a so-called "premise facing interface" IP address). For example, the network facing interface IP address may be a public IP address "64.230.200.100". The assignment of this public IP address can be done by the aforementioned DHCP server (not depicted) coupled to the data network 104. The premise facing interface IP address may be a private IP address "192.168.1.1". In an alternative non-limiting embodiment of the present invention, the network facing interface IP address may comprise a static public IP address.

The home gateway 110*a* can be responsible for assigning private IP addresses to the communication clients 108*a*, 108*b* and 108*c*. For example, the communication client 108*a* may be assigned a private IP address "192.168.1.100", the communication client 108*b* may be assigned a private IP address "192.168.1.101" and the communication client 108*c* may be assigned a private IP address "192.168.1.102".

As one skilled in the art will appreciate, in the specific embodiment depicted in FIG. 1, the private IP addresses assigned to the communication clients 108*a*, 108*b* and 108*c*, as well as the private IP address assigned to the premise facing interface of the home gateway 110*a*, are only routable within the local data network 110, while the public IP address assigned to the network facing interface of the home gateway 110*a* is routable within the data network 104. Accordingly, in order to facilitate exchange of data between the communication clients 108*a*, 108*b* and 108*c* and the data network 104, the home gateway 110*a* can be operable to implement a Network Address Translation (NAT) operation or, in other words, to translate the private IP addresses assigned to the communication clients 108*a*, 108*b* and 108*c* for the purposes of routing data packets to/from the communication clients 108*a*, 108*b* and 108*c* using the public IP address assigned to the home gateway 110*a*.

NAT operation is known to those of skill in the art and, as such, no detailed description of the process will be presented here. However, for the benefit of the reader a brief overview will be presented. The home gateway 110*a* can be operable to receive a packet from one of the communication clients 108*a*, 108*b* and 108*c* (i.e. an outgoing packet). The home gateway 110*a* performs a NAT operation whereby a source address of the received outgoing packet (which in this non-limiting example can be the private IP address of one of the communication clients 108*a*, 108*b* and 108*c* that originated the outgoing packet) is substituted with the network facing interface IP address associated with the home gateway 110*a* and a port number that uniquely identifies one of the communication clients 108*a*, 108*b*, 108*c* which originated the outgoing packet. The home gateway 110*a* can further be operable to compile an internal mapping table 111. The internal mapping table 111 correlates at least (i) an original source address (i.e. the private IP address of one of the communication clients 108a, 108b, 108c that has originated the outgoing packet) to (ii) a port number assigned to the respective one of the communication clients 108a, 108b, 108c. In the specific non-limiting example of FIG. 1, the internal mapping table 111 correlates the private IP address of the communication client 108a (i.e. 192.168.1.100) to a port $110a_1$, the private IP address of the communication client 108b (i.e. 192.168.1.101) to a port $110a_2$, and the private IP address of the communication client 108c (i.e. 192.168.1.102) to a port $110a_3$. Data maintained within the internal mapping table 111 can allow the home gateway 110a to receive a packet destined for one of the communication clients 108a, 108b, 108c (i.e. an incoming packet addressed using the network facing interface IP address associated with the home gateway 110a and a port number associated with the one of the communication clients 108a, 108b, 108c to which the incoming packet is destined for) and using the internal mapping table 111, the home gateway 110a can route the incoming packet to the intended destination (i.e. one of the communication clients 108a, 108b, 108c). The home gateway 110a, thereby, allows for two-way exchange of packets between one or more of the communication clients 108a, 108b and 108c with any other device on the data network 104 (such as, for example, the communication client 116). It should be noted that in an alternative non-limiting embodiment of the present invention, the internal mapping table 111 can be maintained by another device accessible to the home gateway 110a.

In a similar manner, the communication client 116 may be associated with a network address. As a non-limiting example that is presented in FIG. 1, the communication client 116 can be directly coupled to the data network 104 without the use of a home gateway. This is particularly true in those embodiments, where the communication client 116 is embodied in a soft client executed on a computing apparatus, for example. In a non-limiting example, communication client 116 may be associated with an IP address "64.230.200.101", which may be a public IP address or, in other words, an IP address routable within the data network 104. For the purposes of a non-limiting illustration to be presented herein, it is assumed that the communication client 116 is coupled directly to the access connection 103a and, as such, exchange of data with the data network 104 can be performed without the need for any port number mapping.

For the purposes of exchanging data and, more specifically, for the purposes of establishing a communication session (such as, for example, a VoIP call) between two or more of the communication clients 108a, 108b, 108c and 116 (as well as potentially other communication clients), a registration process executed at the network element 112 can be implemented. For the sole purpose of simplifying the description to be presented herein below, an example of the communication session being a VoIP call will be used. However, it should be expressly understood that the type of communication sessions or the data exchanged between the communication clients 108a, 108b, 108c and 116 is not particularly limited and may include a video call, an instant messaging session or a multimedia session, to name just a few possibilities.

Before describing the registration process in detail, a client mapping 200 will now be described in greater detail with reference to FIG. 2A. The client mapping 200 can be maintained by the network element 112 of FIG. 1 for the purposes of facilitating establishing of communication sessions between the communication clients 108a, 108b, 108c, 116 via the data network 104. The network element can maintain the client mapping 200 in an internal database or in a separate database (not depicted) accessible to and under control of the network element 112.

The mapping 200 may maintain a plurality of records, such as records 200a, 200b, 200c1, 200c2 and 200d. Each of the records 200a, 200b, 200c1, 200c2 and 200d may maintain information about registered communication clients, such as for example, communication clients 108a, 108b, 108c and 116. Each of the records 200a, 200b, 200c1, 200c2 and 200d may maintain a relationship between an identifier 202, an address 204 and a sub-address 206. Each of the records 200a, 200b, 200c1, 200c2, 200d can further map the identifier 202 to at least one of an allowed list 208 and a time 210.

In the specific non-limiting embodiment depicted in FIG. 2A, the identifier 202 may comprise an alias or another identifier of a user (such as one of the users 101a, 101b) to which a particular communication client is registered. Some non-limiting examples of the identifier 202 include, but are not limited to, a user account, a proprietary identifier, a network address and the like. In the specific non-limiting embodiment to be presented herein below, the identifier 202 comprises a Session Initiation Protocol (SIP) Universal Resource Identifier (URI) address assigned on a per user account basis or, in other words, all communication clients registered to the same subscriber are associated with the same identifier 202.

The address 204 may comprise an indication of a public network address associated with an endpoint where the communication client is located (such as, for example, the customer premises 102). The sub-address 206 may comprise an identifier that may be used to uniquely identify a particular communication client within its local data network should this be the case (such as, for example, within the local data network 110 of the customer premises 102). For example, in the non-limiting example to be presented herein below, the sub-address 206 may comprise an indication of a port number of the home gateway 110a within the local data network 110 associated with a particular communication client. In an alternative non-limiting embodiment of the present invention, the sub-address 206 may comprise another suitable identifier, such as, for example, a private IP address. In an alternative non-limiting embodiment of the present invention, the sub-address 206 may comprise a value which represents a value derived on the basis of the port number of the home gateway 110a. In yet further non-limiting embodiments of the present invention, the sub-address 206 may comprise an arbitrary value assigned by the home gateway 110a. In alternative embodiments of the present invention, which are particularly applicable where the communication clients 108a, 108b, 108c and 116 can be assigned a public network address, the sub-address 206 may comprise a default value or may be omitted. In the specific non-limiting example being presented herein, the communication client 116 may be associated with a public IP address and, as such, the sub-address 206 associated with the communication client 116 may be a default port value.

The data maintained in the identifier 202 is referred to sometimes herein below as a "user account identifier" and the data maintained in the address 204 and sub-address 206 is jointly referred to as a "communication client identifier". In some examples, as described above, the communication client identifier may only comprise the address 204.

The allowed list 208 can comprise an indication of one or more network identifiers (such as, for example, telephone numbers, SIP URIs, etc.) associated with originating parties that are expected to initiate calls destined to the user associated with the particular communication client. The time 210 may comprise an indication of a time interval when the particular communication client should be alerted of incoming calls. A given communication client (for example, one of the communication clients 108a, 108b, 108c) may be provisioned just with the allowed list 208, just with the time 210 or with a combination of the allowed list 208 and the time 210. How presence/absence of the time 210 qualifies the allowed list 208 and vice versa will be explained in greater detail below using examples.

In some embodiments of the present invention, subscription to the intelligent incoming call handling feature contemplated herein can be performed when the user 101a subscribes to the communication services to be delivered at the customer premises 102. In alternative non-limiting embodiments of the present invention, the subscription to the intelligent incoming call handling feature contemplated herein can be performed or changed at any other suitable time after the original service subscription. For example, the user 101a (or the user 101b) may change the intelligent incoming call handling feature when a new communication client is installed at the customer premises 102. How the user 101a subscribes to or changes the settings of the intelligent incoming call handling feature contemplated herein is not particularly limited and some approaches may include, but are not limited to, calling a customer service representative, interacting with an interactive voice response system, accessing a provisioning web portal or web site, sending an electronic message, sending a short text message, sending an SMS message, sending an Instant Message, filling in and mailing an application form and the like.

The record 200a may be associated with the communication client 108a. As such, the identifier 202 of the record 200a may comprise an alias of the user 101a to whom the communication client 108a is registered or, in other words, who is the subscriber to communication services at the customer premises 102. For example, the alias may be a SIP URI 4162223333@serviceprovider.com. It should be expressly understood that any other suitable form of the identifier 202 of the record 200a can be used, such as a numerical value, an alpha-numerical value, etc. The address 204 of the record 200a may comprise the public IP address associated with the home gateway 110a, which, in the specific non-limiting example being presented herein, is the public IP address "64.230.200.100". The sub-address 206 of the record 200a may comprise an indication of the port number of the home gateway 110a which is associated via the aforementioned internal mapping table 111 within the home gateway 110a with the communication client 108a or, in this non-limiting example, it may comprise "$110a_1$". The allowed list 208 of the record 200a may comprise <416.555.0001><416.555.0002><416.555.0003> indicating that an incoming call originated from one of the telephone numbers listed in the allowed list 208 should be routed to the communication client 108a associated with the user 101b. The time 210 of the record 200a can comprise <empty> indicative that the delivery parameters stored within the allowed list 208 of the record 200a are to apply at all times.

In a similar manner, the record 200b can be associated with the communication client 108b. Since in the non-limiting example being presented herein, the communication client 108b is associated with the same customer premises 102 as the communication client 108a, then for the purposes of the non-limiting example to be presented herein below, it is assumed that the communication client 108b is to be registered with the same user 101a. Accordingly, the identifier 202 of the record 200b can comprise an alias of the user 101a, which in the above example was SIP URI 4162223333@serviceprovider.com. It should be expressly understood that any other suitable form of the identifier 202 of the record 200b can be used, such as a numerical value, an alpha-numerical value, etc. The address 204 of the record 200b may comprise the public IP address associated with the home gateway 110a, which, in the specific non-limiting example being presented herein, is the public IP address "64.230.200.100". The sub-address 206 of the record 200b may comprise an indication of the port number of the home gateway 110a which is associated via the aforementioned internal mapping table 111 within the home gateway 110a with the communication client 108b or, in this non-limiting example, it may comprise "$110a_2$". The allowed list 208 of the record 200b may comprise <empty> indicating that a given incoming call should be routed to the communication client 108b irrespective of which telephone number the given incoming call is originated from. The time 210 of the record 200b can comprise <empty> indicative that the delivery parameters stored within the allowed list 208 of the record 200b are to apply at all times. Within this non-limiting example, the communication client 108b associated with the record 200b can be considered to be a "default communication client" to which incoming calls are routed even when delivery parameters provided with other communication clients associated with the user 101a are not met.

Recalling that the communication client 108c can be located in the home office of the customer premises 102 and that the user 101a can use the home office to run her home-based business, the user 101a may have chosen to provision several sets of delivery parameters to be used for the purposes of the intelligent incoming call handling feature contemplated herein. For the purposes of the example to be presented herein below, it is assumed that the user 101a desires only the incoming calls originated by certain originating parties at a first time interval (ex. during business hours) to be routed to the communication client 108c. The user 101a may further desire for the communication client 108c to be alerted of all calls arriving during a second time interval (ex. outside of business hours). Accordingly, two records associated with the communication client 108c (i.e. record 200c1 and 200c2) are provisioned within the client mapping 200.

The record 200c1 will first be described. Since in the non-limiting example being presented herein, the communication client 108c may be associated with the same user 101a as the communication clients 108a, 108b, then for the purposes of the non-limiting example to be presented herein below, it is assumed that the communication client 108c is to be registered with the same user 101a as the communication clients 108a, 108b. Accordingly, the identifier 202 of the record 200c1 can comprise an alias of the user 101a (who is the subscriber to communication services at the customer premises 102), which in the above example is the SIP URI 4162223333@serviceprovider.com. It should be expressly understood that any other suitable form of the identifier 202 of the record 200c1 can be used, such as a numerical value, an alpha-numerical value, etc. The address 204 of the record 200c1 may comprise the public IP address associated with the home gateway 110a, which, in the specific non-limiting example being presented herein, is the public IP address "64.230.200.100". The sub-address 206 of the record 200c1 may comprise an indication of the port number of the home gateway 110a which is associated via the aforementioned internal mapping table 111 within the home gateway 110a with the communication client 108c or, in this non-limiting example, it may comprise "110$a_3$". The allowed list 208 of the record 200c1 may comprise <416.555.0006><416.555.0007> and the time 210 of the record 200c1 may comprise <8:30-16:30>. The combination of the allowed list 208 and the time 210 of the record 200c1 is indicative that an incoming call originated by one of the telephone numbers listed in the allowed list 208 of the record 200c1 should be routed to the communication client 108c as long as the incoming call is processed between 8:30 am and 4:30 pm.

The record 200c2 can be also associated with the communication client 108c and, as such, the identifier 202, the address 204 and the sub-address 206 of the record 200c2 will be the same as the identifier 202, the address 204 and the sub-address 206 of the record 200c1. The allowed list 208 of the record 200c2 may comprise <empty> and the time 210 of the record 200c2 may comprise <16:31-08:29>. The combination of the allowed list 208 and the time 210 of the record 200c2 is indicative that a given incoming call should be routed to the communication client 108c irrespective of the telephone number associated with the originator of the given incoming call, if the given incoming call is processed between 4:31 in the afternoon and 8:29 in the morning. Within this non-limiting example and similarly to the communication client 108b, the communication client 108c can be considered to be a "default communication client" to which incoming calls are routed even if the delivery parameters provided with other communication clients associated with the user 101a are not met, subject to the time delivery parameters stored in the time 210 of the record 200c2.

The record 200d may be associated with the communication client 116. The identifier 202 of the record 200d may comprise an alias of the user 101c to whom the communication client 116 is registered or, in other words, who is the subscriber to communication services at a location where the communication client 116 is located. In the present example, let the alias comprise a SIP URI 4165556666@serviceprovider.com. It should be expressly understood that any other suitable form of the identifier 202 can be used, such as a numerical value, an alpha-numerical value, etc. The address 204 of the record 200d may comprise the public IP address associated with the communication client 116, which, in the specific non-limiting example being presented herein, is the public IP address "64.230.200.101". The sub-address 206 of the record 200d may comprise an indication of the default port used for exchanging data between the communication client 116 and the data network 104 or, in this non-limiting example, it may comprise the default port number "5060". In alternative embodiments of the present invention, the sub-address 206 of the record 200d can be left blank. In further embodiments of the present invention, when the exchanging of data is implemented using the default port, the sub-address 206 of the record 200d can be omitted altogether. The allowed list 208 and the time 210 of the record 200d may be empty, indicative of the fact that the user 101c is not a subscriber to the intelligent call handling feature contemplated herein.

The client mapping 200 may maintain a number of additional records, jointly depicted at 200n. These additional records 200n may be associated with other communication clients of the infrastructure of FIG. 1, which have been omitted for the sake of simplicity. It should be noted that the intelligent incoming call handling feature may be provisioned in a different way from that described as an example above. For example, in an alternative non-limiting embodiment of the present invention, the intelligent incoming call handling feature may be provisioned on a per SIP URI basis, rather than on a per-communication-client basis.

In yet further non-limiting embodiments of the present invention, an indication of the subscription to the intelligent incoming call handling feature may be stored in a separate database (not depicted) from the client mapping 200, this separate database referred to herein below as a delivery rule database. Within these non-limiting embodiments of the present invention, the client mapping 200 can map, for example, a SIP URI associated with a user who subscribes to the intelligent incoming call handling feature contemplated herein and a flag indicative of the fact that the user is the subscriber to the intelligent incoming call handling feature contemplated herein. The flag can trigger the network element 112 to perform a look up into the delivery rule database. In an alternative non-limiting embodiment of the present invention, there may be no need for the flag and the network element 112 can always perform a look up into the delivery rule database. The delivery rule database can be maintained by the network element 112 or by another computing apparatus coupled to the network element 112 via the data network 104 or another communication network. Within some of these non-limiting embodiments of the present invention, the other computing apparatus that maintains the delivery rule database can be coupled to more than one network element, including the network element 112.

It should be expressly understood that how various fields within the client mapping 200 (or the delivery rule database) are structured are not particularly limited. Even though FIG. 2A illustrates a non-limiting embodiment of the client mapping 200 that is maintained on a per-communication client basis, in alternative non-limiting embodiments of the present invention, the client mapping 200 can be maintained on a per-SIP URI basis, on a per delivery parameter basis, etc.

In some non-limiting embodiments of the present invention, the above-mentioned active call table may be integrated with the client mapping 200.

How the client mapping 200 is generated is not particularly limited. In a specific non-limiting embodiment of the present invention, the client mapping 200 may be generated during a registration process of the communication clients 108a, 108b, 108c and 116 with the network element 112. Prior to describing the registration process, certain non-limiting assumptions will be made for the sole purpose of illustrating and providing an example for the description to be presented below.

Firstly, it is assumed that the communication clients 108a, 108b, 108c and 116 and the network element 112 implement a communication protocol for exchanging data therebetween. In a specific non-limiting embodiment of the present invention, the communication protocol may comprise Session Initiation Protocol (SIP). In an alternative non-limiting embodiment of the present invention, the communication protocol may comprise Simple Object Access Protocol (SOAP) or it may comprise ITU-T's H.323 signalling protocol. It should be expressly understood that any suitable communication protocol may be used, whether standards-based or proprietary. Some examples of the proprietary protocols that can be used include, but are not limited to, Unified Stimulus (UNISTIM) protocol, Mitel Networks Telephony Application Inter (MiTAI) protocol, Skiny, etc.

Secondly, it is assumed that each of the communication clients 108a, 108b, 108c and 116 is aware of the location of the network element 112 or, in other words, a network address associated with the network element 112. In some embodiments of the present invention, the network element 112 may be associated with a static network address, such as, but not limited to, a static IP address "64.230.100.100". In these embodiments of the present invention, the communication clients 108a, 108b, 108c and 116 may be pre-programmed with the static IP address of the network element 112. In an alternative embodiment of the present invention, the network element 112 may be associated with a Uniform Resource Locator (URL), such as, for example, "http://www.soft-switch.serviceprovider.com". In these non-limiting embodiments of the present invention, the communication clients 108a, 108b, 108c and 116 may be pre-programmed with the URL of the network element 112. In yet further non-limiting embodiments of the present invention, the network element 112 may be associated with a dynamic network address, such as, for example, a dynamic IP address. In these non-limiting embodiments of the present invention, the communication clients 108a, 108b, 108c and 116 may discover the dynamic IP address of the network element 112 via an appropriate address discovery procedure, such as, for example, a Domain Name Service (DNS) look up. In some non-limiting embodiments of the present invention, the home gateway 110a or the access device 106 can be aware of the location of the network element 112 rather than the communication clients 108a, 108b, 108c. It should be noted that in alternative non-limiting embodiments of the present invention, the communication clients 108a, 108b, 108c may not be aware of the location of the network element 112. They may be, instead, be aware of the location of another network element (such as, for example, a Session Border Controller, a proxy server, etc.).

Figure 3:
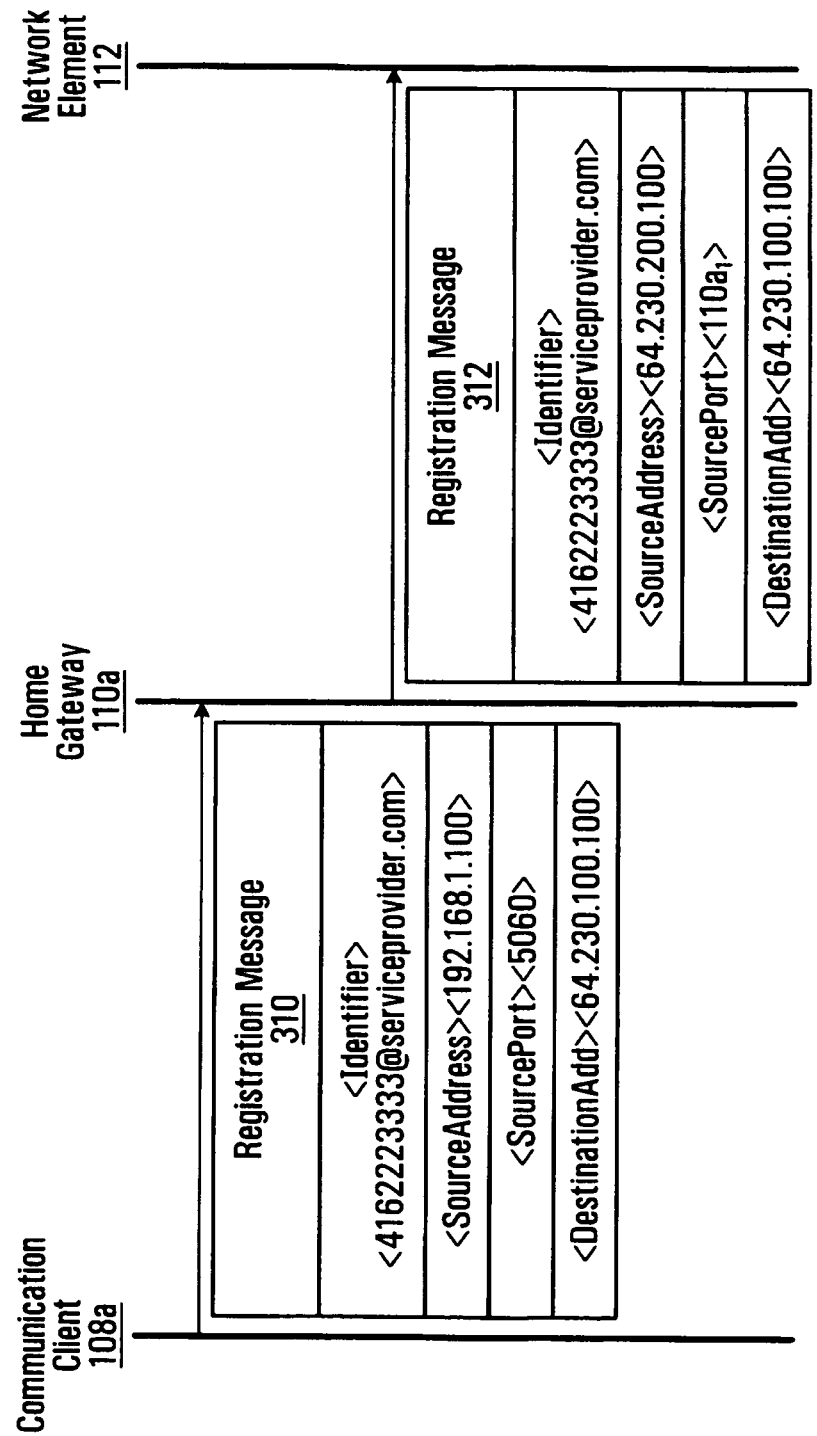
FIG. 3 is a signal flow diagram depicting a non-limiting embodiment of a flow of signals exchanged between a communication client and the network element of FIG. 1 during a registration process.

Having made these non-limiting assumptions, a registration process by virtue of which the communication clients 108a, 108b, 108c and 116 can register with the network element 112 will now be described in greater detail. With reference to FIG. 3, an example of how the communication client 108a can register with the network element 112 will now be described. In some non-limiting embodiments of the present invention, the communication client 108a may perform the registration process, when the communication client 108a is powered on for the first time. In an alternative non-limiting embodiment of the present invention, the communication client 108a may perform the registration process after being unplugged and moved to a new location. In yet further non-limiting embodiments of the present invention, the communication client 108a can perform the registration process on-demand, for example, when triggered by the user 101a, by an application executed on the communication client 108a or by an application executed on another device in the customer premises 102 or connected to the data network 104. For example, each of the records 200a-200n may be assigned an "expiry" indicator. The expiry indicator can be set by the network element 112, it can be requested by the communication client submitting a registration request or it can comprise a default value (ex. 3600 seconds or the like). When the "expiry" indicator expires or shortly thereafter, the network element 112 may cause the respective communication client associated with the expired record 200a-200n to re-execute the registration process.

It should be noted that in alternative non-limiting embodiments of the present invention, a service provider who is responsible for managing the network element 112 can pre-provision the client mapping 200. Within these embodiments of the present invention, the registration process can be omitted. This scenario is particularly applicable in those non-limiting embodiments of the present invention, where the communication clients 108a, 108b, 108c, 116 and/or the home gateway 110a are assigned static network addresses.

It should be noted that in some non-limiting embodiments of the present invention, each of the communication clients 108a, 108b, 108c and 116 may be aware of its respective SIP URI (or another indication of the user account). How the communication clients 108a, 108b, 108c and 116 may become aware of their respective SIP URI is not particularly limited. In some embodiments of the present invention, an indication of the SIP URI may be programmed into each of the communication clients 108a, 108b, 108c and 116 before they are dispatched to the respective users 101a, 101b. However, in alternative non-limiting embodiments of the present invention, the indication of the SIP URI can be inputted by the respective user 101a, 101b during the registration process. In an alternative non-limiting embodiment of the present invention, the indication of the SIP URI can be determined by the communication client 108a by interacting with the home gateway 110a or with the access device 106. For the purposes of the non-limiting example to be presented herein below, it is assumed that the user 101a has inputted the indication of the SIP URI (i.e. 4162223333@serviceprovider.com or a portion thereof) into the communication client 108a.

The communication client 108a generates a registration message 310, which can be, but is not limited to, a SIP registration message. The registration message 310 can comprise an indication of an identifier of the communication client 108a, such as the SIP URI 4162223331@serviceprovider.com (i.e. an "identifier"). The registration message 310 can further comprise an indication of a network address of the communication client 108a (ex. a so-called "source address"), which in this non-limiting example can comprise the private IP address of the communication client 108a (i.e. the private IP address 192.168.1.100 and an indication of a source port, which can be a default TCP/UDP port value (ex. "1080"). The registration message 310 can further comprise an indication of the network address of the network element 112 (ex. the public IP address 61.230.100.100), i.e. a so-called "destination address". In an alternative non-limiting embodiment of the present invention, the destination address may be omitted from the registration message 310. Within these embodiments of the present invention, the destination address can be populated, for example, by the home gateway 110a as part of compiling a registration message 312 to be described below or by another entity. In further alternative non-limiting embodiments of the present invention, the identifier of the communication client 108a can be omitted from the registration message 310. Within these embodiments of the present invention, the identifier of the communication client 108a can be populated, for example, by the home gateway 110a as part of compiling a registration message 312 to be described below or by another entity. The communication client 108a then sends the registration message 310 towards the home gateway 110a via the local data network 110, using for example, SIP protocol.

The home gateway 110a receives the registration message 310 and compiles the registration message 312 by augmenting data received as part of the registration message 310. To that end, the home gateway 110a creates the registration message 312 by replacing the value in the received source address field by its own public IP address, which in this non-limiting example can comprise the public IP address of the home gateway 110a (i.e. the public IP address "64.230.200.100"). The home gateway 110a further substitutes the value of the received source port with the source port number of the home gateway 110a associated with the communication client 108a (ex. "110a₁"). The home gateway 110a then sends the registration message 312 towards the network element 112 via the access device 106 and the data network 104.

When the network element 112 receives the registration message 312, it examines its content. The network element 112 retrieves the identifier of the communication client 108a from the registration message 312 and populates the identifier 202 of the record 200a. It then retrieves the source address and populates the address 204. Using the data received as part of the source port, the network element 112 populates the sub-address 206. Accordingly, the network element 112 is operable to populate the aforementioned record 200a with the information received as part of the registration message 312. If the network element 112 determines that the record 200a associated with the communication client 108a already exists (i.e. an old record 200a), the network element 112 can delete the old record 200a and populate a new record 200a with the identifier 202, the address 204 and the sub-address 206 received as part of the registration message 312. Alternatively, the network element 112 can modify a portion of the old record 200a to derive the new record 200a.

In substantially the same manner, the communication clients 108b and 108c can generate and transmit registration messages similar to the registration messages 310 to enable the network element 112 to generate records 200b and 200c1 respectively. The communication client 116 can generate a registration message similar to the registration message 312 with a default port number as the sub-address 206 to enable the network element 112 to generate the record 200d.

It should be noted that in alternative non-limiting embodiments of the present invention, where the home gateway 110a is not SIP-aware, the home gateway 110a may perform a NAT operation on an IP packet encapsulating the SIP registration request. Within these embodiments, the home gateway 110a amends information maintained within the IP packet encapsulating the SIP registration request and leaves the SIP registration request intact.

The network element 112 may generate the allowed list 208 and the time 210 during the registration process described immediately above or, in other words, one of the communication clients 108a, 108b, 108c can transmit data required for generating the allowed list 208 and/or the time 210 based on input by the user 101a (or the user 101b) as part of the registration process. In an alternative non-limiting embodiment of the present invention, the network element 112 may generate the allowed list 208 and the time 210 at a later time, when the user 101a subscribes to the intelligent incoming call handling feature. The network element 112 may update one or more of the allowed list 208 and the time 210 when the user 101a (or the user 101b) makes changes to the intelligent incoming call handling feature contemplated herein. For example, the following non-limiting scenario is envisioned. Let's assume that the user 101a first provisions a first delivery parameter associated with the communication client 108c for signifying how a first set of incoming calls (for example, calls originated from a specific telephone number or at a specific time) should be routed for which the record 200c1 is updated with the allowed list 208 and the time 210 representative of the first delivery parameter. At some time thereafter, the user 101a may decide to provision a second delivery parameter associated with the communication client 108c for signifying how a second set of incoming calls (for example, calls originated from a specific telephone number or at a specific time) should be routed. The network element 112 determines that the record 200c1 has been already created for the communication client 108c. The network element 112, accordingly, creates the record 200c2, which comprises the identifier 202, the address 204 and the sub-address 206 substantially the same as the identifier 202, the address 204 and the sub-address 206 of the record 200c1. The network element 112 then generates the allowed list 208 and the time 210 of the record 200c2 to represent the second delivery parameter. It should be expressly understood that how the user 101a (or the user 101b) can provide an indication of data required for generating the allowed list 208 and the time 210 is not particularly limited and, as such, some example of how the data can be provided include, but are not limited to, interacting with a customer services representative, accessing a web site or a web portal and providing data using the web site or the web portal, using one of the communication clients 108a, 108b, 108c; filling in and mailing an application form, sending an electronic message, sending a short text message, sending an SMS message, sending an Instant Message and the like.

In some embodiments of the present invention, the network element 112 can perform a "sanity check" of the delivery parameter being provisioned by the user 101a. For example, the network element 112 may check if the delivery parameter being provisioned is identical to a previously-provisioned delivery parameter. If this is the case, the network element 112 can provide an error message to the user 101a. Alternatively, the network element 112 may check if the delivery parameter being provisioned contradicts a previously provisioned delivery parameter. If this if the case, the network element 112 can provide an error message to the user 101a or solicit from the user 101a an indication of which one of the delivery parameter being provisioned and the previously provisioned delivery parameter the user 101a wishes to keep. Other alternative are, of course, possible and will become apparent to those of skill in the art.

Figure 2B:
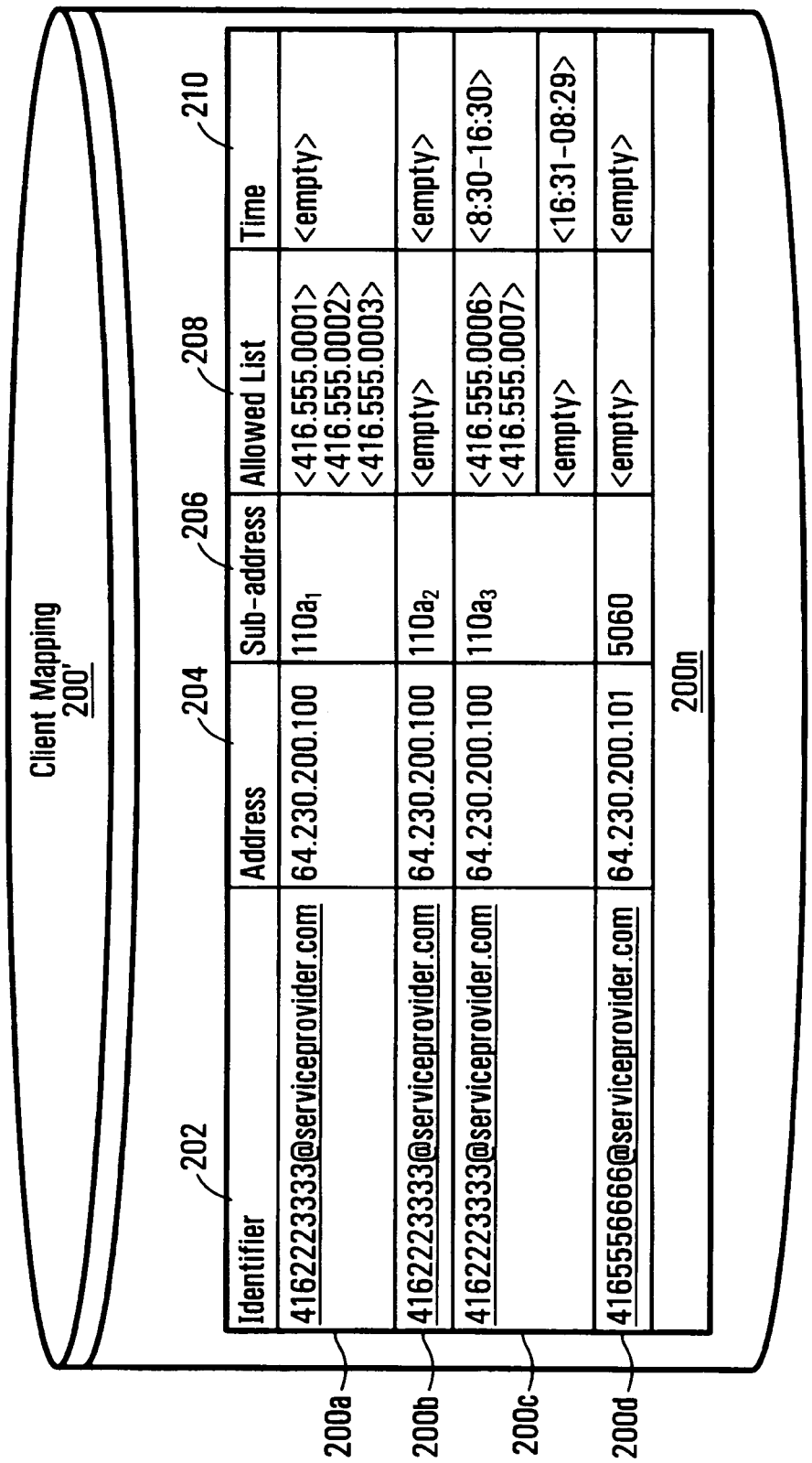

An alternative non-limiting embodiment of the present invention is depicted in FIG. 2B, which illustrates a non-limiting embodiment of a client mapping 200'. The client mapping 200' is substantially similar to the client mapping 200 and, as such, like elements are depicted with like numerals. Within this embodiment of the present invention, rather than generating two records, the network element 112 can augment a single record 200c associated with the communication client 108c with the second delivery parameter.

It should be understood that several components of the infrastructure of FIG. 1 can be omitted, configured differently or substituted by alternative components. A non-limiting example of one possible alternative of the infrastructure of FIG. 1 will now be described. In an alternative non-limiting embodiment of the present invention, the communication clients 108a, 108b and 108c may be registered to the same user 101a, but may not be necessarily all located at the customer premises 102. For example, the communication client 108c may comprise a wireless VoIP phone and, as such, may not be physically located at the customer premises 102 all the time. As another example, the communication client 108b may be a VoIP phone located at a secondary residence (not depicted), such as a cottage, but nevertheless may still be registered to the same user account associated with the user 101a. Accordingly, it should be understood that, broadly speaking, the communication clients 108a, 108b and 108c are associated with the user 101a not by virtue of being in the same physical location (ex. the customer premises 102), but rather being registered to a single user account (ex. the user account associated with the user 101a). It should be further understood that within these non-limiting alternative embodiments, the various communication clients associated with the same user account will all have the same "user account information" (or another identifier common to the communication clients 108a, 108b, 108c) stored within identifier 202 of the client mapping 200, but may have different network addresses stored within the address 204 and sub-address 206. Within yet further non-limiting embodiments of the present invention, some of the communication clients 108a, 108b, 108c can be coupled to a first communication network (such as, for example, the data network 104) and others of the communication clients 108a, 108b, 108c can be coupled to a second communication network (such as for example, another network substantially similar to the data network 104, a wireless communication network, etc.). Within these non-limiting embodiments of the present invention, irrespective of whether the given one of the communication clients 108a, 108b, 108c is coupled to the first or the second communication networks, the given one of the communication clients 108a, 108b, 108c logs in with the same user account and, as such, is associated with the same user account.

Figure 4:
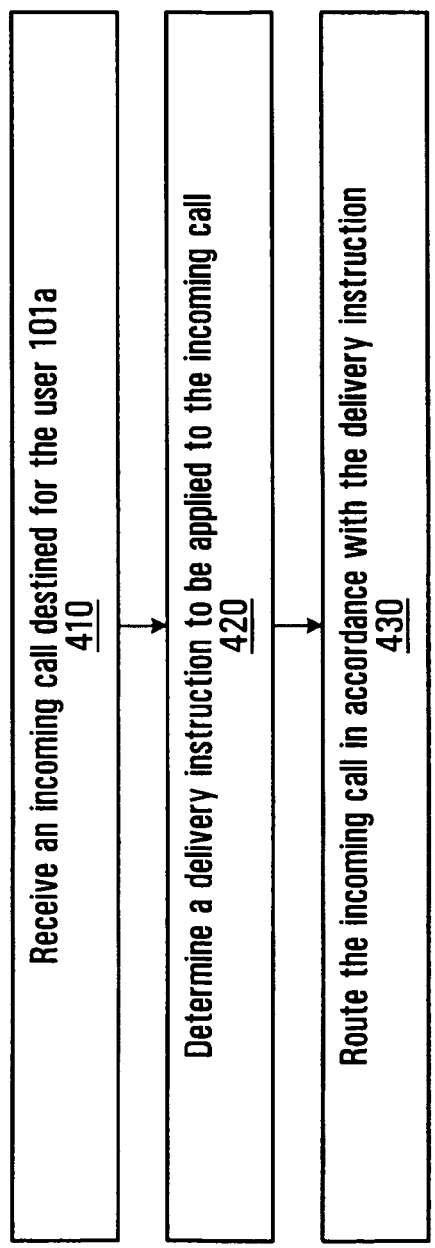
FIG. 4 is a flow chart representing a non-limiting embodiment of a method for intelligently handling a request for a communication session within the infrastructure of FIG. 1.

Given the infrastructure of FIG. 1, it is possible to execute a method for intelligently handling a request for a communication session. With reference to FIG. 4, a non-limiting embodiment of a method for handling a request for a communication session will be described. An example non-limiting embodiment of the method will be described in the context of the following non-limiting assumptions:

- the user 101a is a subscriber to the intelligent incoming call handling feature contemplated herein and, as such, the allowed list 208 and the time 210 of the records 200a, 200b, 200c1 and 200c2 have been provisioned as has been described above with reference to FIG. 2A;
- the network element 112 and the communication clients 108a, 108b, 108c, 116 implement SIP protocol and, as such, an incoming call directed, for example, to one of the communication clients 108a, 108b, 108c is addressed by the SIP URI associated with the communication clients 108a, 108b, 108c (i.e. 4162223333@serviceprovider.com).

Furthermore, for illustration purposes only, the following scenarios will be used to provide examples to the method to be described below:

Scenario A: An incoming call is received from an originating party associated with a telephone number 416.555.0002 at 2 pm.
Scenario B: An incoming call is received from an originating party associated with a telephone number 416.555.0006 at 9:00 pm.

Step 410

The method begins at step 410, at which an incoming call destined for the SIP URI associated with the user 101a is received at the network element 112. For the purposes of the description to be presented herein below, it is assumed that the incoming call is a voice call. It should be expressly understood that the voice call is just one non-limiting example of a communication session a request for establishment of which can be handled using embodiments of the method presented herein. Other non-limiting types of communication sessions include, but are not limited to, multi-media calls, video calls and the like.

In the specific non-limiting example being presented herein, the network element 112 receives a SIP INVITE message indicative of the incoming call, the SIP INVITE message may identify the destination party by the SIP URI "4162223333@serviceprovider.com". In alternative non-limiting embodiments of the present invention, another suitable type of signalling message indicative of the incoming call destined for the user 101a may be received at the network element 112.

Step 420

Next, at step 420, the network element 112 determines a delivery instruction to be applied to the incoming call destined for the user 101a. More specifically, the network element 112 determines a subset of the communication clients associated with the SIP URI for which the incoming call is destined.

It will be recalled that as part of step 410, the network element 112 has become aware of the SIP URI that the incoming call is destined for. The network element 112 accesses the client mapping 200 and performs a look up of the identifiers 202 that match the SIP URI received as part of the SIP INVITE message or another signalling message used for establishing the incoming call. In the specific example being presented herein, the network element 112 determines that records 200a, 200b, 200c1 and 200c2 are associated with the identifier 202 that matches the SIP URI that has been received as part of step 410 within the SIP INVITE message or another signalling message used for establishing the incoming call. Accordingly, the network element 112 determines that communication clients 108a, 108b and 108c are registered in association with the SIP URI for which the incoming call is destined.

The network element 112 then examines the allowed list 208 and the time 210 provisioned within records 200a, 200b, 200c1, 200c2 in order to determine whether any delivery parameters represented by this data are satisfied:

Scenario A: Within this non-limiting scenario, the network element 112 determines that delivery parameters stored within the allowed list 208 (i.e. one of the telephone numbers stored therein) of the record 200a are satisfied (i.e. the telephone number associated with the originating party matches one of the telephone numbers stored within the allowed list 208). Since the time 210 of the record 200a is empty, the network element 112 determines that the delivery parameters stored within the allowed list 208 of the record 200a are to be applied irrespective of the processing time.

The network element 112 further determines that delivery parameters stored within the allowed list 208 and the time 210 of the record 200b are satisfied. Since both the allowed list 208 and the time 210 of the record 200b are empty, the network element 112 determines that all incoming calls should be routed to the communication client 108b irrespective of the originating party or the processing time. The network element 112 further determines that the delivery parameters stored in the allowed list 208 and the time 210 of the records 200c1 and 200c2 are not satisfied.

The network element 112, therefore, deduces that the delivery instruction is to route the incoming call to the communication client 108a and the communication client 108b. Accordingly, the network element 112 determines that a subset of communication clients 108a, 108b, 108c (associated with the SIP URI for which the incoming call is destined), to which the incoming call should be routed, comprises the communication clients 108a, 108b.

Scenario B: The network element 112 determines that the delivery parameters stored in the allowed list 208 and the time 210 of the record 200a are not satisfied. The network element 112 further determines that the delivery parameters stored within the allowed list 208 and the time 210 of the record 200b are satisfied. The network element 112 further determines that the delivery parameters stored within the allowed list 208 and the time 210 of the record 200c1 are not satisfied. Even though the telephone number of the originating party matches one of the telephone numbers stored within the allowed list 208 of the record 200c1, the current time (i.e. 9:00 pm) does not match the time stored within the time 210. The network element 112 further determines that the delivery parameters stored within the allowed list 208 and the time 210 of the record 200c2 are satisfied.

The network element 112, therefore, deduces that the delivery instruction is to route the incoming call to the communication client 108b and the communication client 108c. Accordingly, the network element 112 determines that a subset of communication clients 108a, 108b, 108c (associated with the SIP URI for which the incoming call is destined), to which the incoming call should be routed, comprises the communication clients 108b, 108c.

Step 430

Next, at step 430, the network element 112 routes the incoming call based on the delivery instruction determined at step 420. More specifically, the network element 112 routes the incoming call to the subset of communication clients 108a, 108b, 108c determined at step 420. To that end, the network element 112 can generate SIP INVITE message(s) specifically destined for the communication client(s) as per the delivery instruction determined at step 420. For example, within Scenario A, the network element 112 can generate two SIP INVITE messages destined for the communication client 108a and the communication client 108b. Within Scenario B, the network element 112 can generate SIP INVITE messages destined for the communication clients 108b, 108c. It should be expressly understood that any other suitable type of signalling message can be used for connecting the incoming call to the communication client(s).

If the network element 112 is not able to determine the CLID information associated with the originator of the incoming call and, therefore, not able to determine whether some of the delivery parameters stored within the allowed lists 208 have been satisfied as part of step 420, the network element 112 may execute one of the two actions at step 430:
  route the incoming call to all communication clients 108a, 108b, 108c associated with the SIP URI for which the incoming call is destined; or
  route the incoming call to one or more default communication clients (i.e. communication client 108b and the communication client 108c, subject to the current time when the incoming call is processed).

A First Optional Enhancement

The optional enhancement to the method of FIG. 4 will be described in the context of the above-referenced Scenario A. It will be recalled that within this scenario, the network element 112 has determined that the incoming call is to be routed to the communication client 108a and the communication client 108b as part of step 420. Accordingly, the network element 112 has transmitted a SIP INVITE message (or another type of signalling message) to the communication client 108a and the communication client 108b at step 430.

Let it now be assumed that the user 101b does not answer the incoming call, for example, the user 101b may not be at the customer premises 102 when the incoming call arrives. The network element 112 may determine, after a pre-determined number of rings (for example, 3 rings, 5 rings, etc.) or after a pre-determined period of time (for example, 15 seconds, 30 seconds, 2 minutes, etc) that the incoming call has not been routed successfully. In some embodiments of the present invention, the network element 112 may attempt to re-route the incoming call. For example, the network element 112 may attempt to route the incoming call to all communication clients registered to the same SIP URI (ex. all of the communication clients 108a, 108b, 108c). In an alternative non-limiting embodiment of the present invention, the network element 112 may attempt to route the incoming call to some of the communication clients registered to the same SIP URI (ex. the communication client 108c) in a pre-determined order. This pre-determined order can be determined by examining for example, the allowed list 208 or another field of the client mapping 200.

In yet further non-limiting embodiments of the present invention, the network element 112 may re-route the incoming call to a voicemail system. For example, if the incoming call is not answered at any of the communication clients 108a, 108b, 108c, the network element 112 may re-route the incoming call to the voicemail system.

A Second Optional Enhancement

In some non-limiting embodiments of the present invention, it is envisioned that the network element 112 may determine that delivery parameters provisioned in association with more than one communication client are satisfied by a given incoming call, such as the case within the above-described Scenario B. As has been described above, the network element 112 can determine that the delivery instruction is to route the given incoming call to all communication clients that have been provisioned with the delivery parameter that is satisfied by the given incoming call. In an alternative non-limiting embodiment of the present invention, it is contemplated that the network element 112 may solicit from the originating party associated with the given incoming call which one of the communication clients that have been provisioned with delivery parameters that are satisfied by the given incoming call, the originating party would like the given incoming call to be routed to (i.e. soliciting an auxiliary delivery instruction).

Within the above-described Scenario B, the network element 112 may inform the originating party that the given incoming call can be routed to the communication client 108b and the communication client 108c. For example, the network element 112 can present an audio message, a text message or a combined audio/text message announcing to originating party that the given incoming call that the originating party has originated can be routed to two communication clients 108b, 108c. In an alternative non-limiting embodiment of the present invention, the audio, text or combination message may be presented to the originating party via another suitable means (such as, for example, via a cell phone, via an instant messaging application, a pop-up window in a computing apparatus and the like). In a non-limiting embodiment of the present invention, the network element 112 may identify the communication clients 108b, 108c by the respective sub-addresses 206 of the communication clients 108b, 108c.

In alternative non-limiting embodiments of the present invention, the network element 112 may maintain an indication of an auxiliary identifier of each of the communication clients 108a, 108b and 108c, the auxiliary identifier being more amenable to being remembered and understood by the user 101a than the sub-addresses 206. Some examples of the auxiliary identifiers include, but are not limited to, "Line 1"/"Line 2"/"Line 3", "Bob"/"Mary"/"Jonathan", "Accounting"/"Marketing"/"Customer Services". Naturally, other types of the auxiliary identifiers are possible. The indication of the auxiliary identifier may be stored in the aforementioned client mapping 200 and be provisioned during the aforementioned registration process or at another time for each or some of the communication clients 108a, 108b and 108c. In these non-limiting embodiments of the present invention, the network element 112 may identify the communication clients 108b, 108c by presenting to the originating party the respective auxiliary identifier of the communication client 108a, 108c.

The network element 112 may further solicit an indication from the originating party of which one of the communication clients 108b, 108c the originating party wishes to contact.

The originating party can then provide the indication of which one of the communication clients 108b, 108c the originating party wishes to contact. In some non-limiting embodiments of the present invention, the originating party may provide the indication of which of the communication clients 108b, 108c the originating party wishes to contact by, for example, producing a spoken utterance indicative of which of the communication clients 108b, 108c the originating party wishes to contact, by keying in a pre-determined sequence of keys indicative of which of the communication clients 108b, 108c the originating party wishes to contact, by clicking a pre-determined key, link or button indicative of which of the communication clients 108b, 108c the originating party wishes to contact. Naturally, the indication of which of which of the communication clients 108b, 108c the originating party wishes to contact may be provided by other means which will become apparent to those of skill in the art.

It should be understood that in alternative embodiments of the present invention, each or some of the communication clients 108a, 108b, 108c can be associated with a negative delivery parameter indicative of, for example, incoming calls received from certain originating parties that should not be routed to a given one of the communication clients 108a, 108b, 108c. Alternatively, the negative delivery parameter can be indicative of certain time intervals during which received incoming calls should not be routed to a given one of the communication clients 108a, 108b, 108c.

In an alternative non-limiting embodiment of the present invention, the user 101a may choose not to provision a default communication client. For example, within the above-described scenario, the user 101a may have chosen not to provision the communication client 108b and the communication client 108c at certain time intervals as the default communication clients. Within these embodiments of the present invention, an incoming call received from one of the telephone numbers provisioned within the allowed list 208 will be routed only to those communication clients that are associated with the allowed list 208 containing the telephone number that originated the incoming call. In an alternative non-limiting embodiment of the present invention, the fact that delivery parameters within an allowed list 208 associated with a given communication client within a group of communication clients (for example, registered to the same SIP URI) are satisfied may override delivery parameters provisioned in association with other communication clients registered to the same SIP URI. For example, in the above-described Scenario 1, where an incoming call is received from a telephone number 416.555.0002 at 2 pm, the following alternative call processing is envisioned:

the network element 112 determines that the delivery parameters provisioned within the allowed list 208 and the time 210 of the record 200a are met;

the network element 112 further determines that the communication client 108b associated with the record 200b has been provisioned as a default communication client, however in this non-limiting embodiment of the present invention, the network element 112 determines that the fact that the delivery parameters provisioned with the allowed list 208 and the time 210 of the record 200a override the provisioning of the communication client 108b as the default communication client. Therefore, within this non-limiting implementation, the network element 112 can deduce that the delivery instruction is to route the incoming call only to the communication client 108a.

Even through the foregoing description has been presented in the context of determining a delivery instruction by verifying if delivery parameters provisioned within the allowed list 208 and the time 210 have been met, in alternative non-limiting implementation of the present invention, the network element 112 can determine a delivery instruction based on whether or not delivery parameters provisioned only within the allowed list 208 or delivery parameters provisioned only the time 210 are satisfied.

Consider a non-limiting embodiment, where only the delivery parameters provisioned with the time 210 are used to determine a delivery instruction. Within these non-limiting embodiments of the present invention, the user 101a (or the user 101b) can provision the delivery parameters within the time 210 to signify, for example:

a time interval during which a particular communication client should be alerted of incoming calls, for example alerting the particular communication client between 9 am and 10 pm, which further means that the particular communication client should not be alerted of incoming calls received outside of this time interval;

a time interval during which a particular communication client should not be alerted of incoming call (a "do not disturb" feature), for example not alerting the particular communication client between 10 pm and 8 am.

It should be understood that teachings of this invention are not limited to voice-over-packet or VoIP communication sessions and one skilled in the art can easily adapt the teachings presented herein to other protocols for handling voice-over-a-network communications.

Those skilled in the art will appreciate that certain functionality of the network element 112 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the network element 112 and/or other elements may be implemented as an arithmetic and logic unit (ALU) having access to a code memory (not shown) which stores program instructions for the operation of the ALU. The program instructions could be stored on a medium which is fixed, tangible and readable directly by the network element 112 and/or other elements, (e.g., removable diskette, CD-ROM, ROM, fixed disk, USB drive), or the program instructions could be stored remotely but transmittable to the network element 112 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method comprising:
   receiving, at a processing time, a request for a communication session, said request comprising a destination network identifier, said request having been originated by an originating party associated with an originating identifier;
   first identifying based on the destination network identifier, a plurality of communication clients registered to the destination network identifier;
   second identifying, based on at least one of said originating identifier and said processing time, a subset of at least two communication clients among the plurality of communication clients identified as being registered to the destination network identifier;
   delivering said request to each communication client in said subset of said plurality of communication clients.

2. The method defined in claim 1, wherein said second identifying is based on said originating identifier.

3. The method defined in claim 1, wherein said second identifying is based on said processing time.

4. The method defined in claim 1, wherein said second identifying is based on both said originating identifier and said processing time.

5. The method defined in claim 1, further comprising:
   accessing a database that maps at least one network identifier associated with at least one registered client to at least one corresponding delivery parameter;
   if said destination network identifier corresponds to at least one of said at least one network identifier associated with at least one registered client, retrieving said at least one corresponding delivery parameter.

6. The method defined in claim 5, wherein said second identifying comprises, if said at least one corresponding delivery parameter is satisfied, determining that said at least one registered client is within said subset of said plurality of communication clients.

7. The method defined in claim 6, wherein said at least one corresponding delivery parameter comprises an indication of at least one originating identifier.

8. The method defined in claim 7, further comprising determining that said at least one corresponding delivery parameter is satisfied if said originating identifier corresponds to said indication of at least one originating identifier.

9. The method defined in claim 7, wherein said indication of at least one originating identifier comprises at least one of:
   an indication of an allowed network identifier; and
   an indication of a disallowed network identifier.

10. The method defined in claim 6, wherein said at least one corresponding delivery parameter comprises an indication of a time interval.

11. The method defined in claim 10, further comprising determining that said at least one corresponding delivery parameter is satisfied if said processing time falls within said time interval.

12. The method defined in claim 10, further comprising determining that said at least one corresponding delivery parameter is satisfied if said processing time falls outside of said time interval.

13. The method defined in claim 6, wherein said at least one corresponding delivery parameter comprises a combination of an indication of at least one originating identifier and an indication of a time interval.

14. The method defined in claim 13, further comprising:
   determining that said at least one corresponding delivery parameter is satisfied if (i) said originating identifier corresponds to said indication of at least one originating identifier; and (ii) said processing time falls within said time interval.

15. The method defined in claim 5, wherein said retrieving at least one corresponding delivery parameter comprises retrieving a first delivery parameter associated with a first communication client within said plurality of communication clients and a second delivery parameter associated with a second communication client within said plurality of communication clients, and wherein the method further comprises verifying if said first delivery parameter and said second delivery parameter are satisfied.

16. The method defined in claim 15, wherein said second identifying said subset of said plurality of communication clients comprises:
   determining that said first communication client is within said subset if said first delivery parameter is satisfied; and
   determining that said second communication client is within said subset if said second delivery parameter is satisfied.

17. The method defined in claim 15, wherein if it is determined that said first delivery parameter is satisfied, said second identifying said subset of said plurality of communication clients comprises determining that only said first communication client belongs to said subset irrespective of whether said second delivery parameter is satisfied.

18. The method defined in claim 1, further comprising:
   accessing a first database that maps at least one network identifier associated with at least one registered client to an indication of a subscription to an incoming call handling feature;
   responsive to said destination network identifier corresponding to one of said at least one network identifier, determining that said destination network identifier has been provisioned with the incoming call handling feature;
   accessing a second database that maps at least one network identifier to at least one corresponding delivery parameter;
   based on said destination network identifier, retrieving from said second database said at least one corresponding delivery parameter to be applied to said communication session.

19. The method defined in claim 18, wherein said second identifying comprises, if said at least one corresponding delivery parameter is satisfied, determining that said at least one registered client is within said subset of said plurality of communication clients.

20. The method defined in claim 19, wherein said at least one corresponding delivery parameter comprises an indication of at least one originating identifier.

21. The method defined in claim 20, further comprising determining that said at least one corresponding delivery parameter is satisfied if said originating identifier corresponds to said indication of at least one originating identifier.

22. The method defined in claim 20, wherein said indication of at least one originating identifier comprises at least one of:
   an indication of an allowed network identifier; and
   an indication of a disallowed network identifier.

23. The method defined in claim 19, wherein said at least one corresponding delivery parameter comprises an indication of a time interval.

24. The method defined in claim 23, further comprising determining that said at least one corresponding delivery parameter is satisfied if said processing time falls within said time interval.

25. The method defined in claim 23, further comprising determining that said at least one corresponding delivery parameter is satisfied if said processing time falls outside of said time interval.

26. The method defined in claim 19, wherein said at least one corresponding delivery parameter comprises a combination of an indication of at least one originating identifier and an indication of a time interval.

27. The method defined in claim 26, further comprising:
determining that said at least one corresponding delivery parameter is satisfied if (i) said originating identifier corresponds to said indication of at least one originating identifier, and (ii) said processing time falls within said time interval.

28. The method defined in claim 18, wherein said retrieving at least one corresponding delivery parameter comprises retrieving a first delivery parameter associated with a first communication client within said plurality of communication clients and a second delivery parameter associated with a second communication client within said plurality of communication clients, and wherein the method further comprises verifying if said first delivery parameter and said second delivery parameter are satisfied.

29. The method defined in claim 28, wherein said second identifying said subset of said plurality of communication clients comprises:
determining that said first communication client is within said subset if said first delivery parameter is satisfied; and
determining that said second communication client is within said subset if said second delivery parameter is satisfied.

30. The method defined in claim 28, wherein if it is determined that said first delivery parameter is satisfied, the second identifying said subset of said plurality of communication clients comprises determining that only said first communication client belongs to said subset irrespective of whether said second delivery parameter is satisfied.

31. The method defined in claim 1, further comprising determining if said delivering is successful.

32. The method defined in claim 31, further comprising, if said delivering is determined not to be successful, attempting to re-deliver said request.

33. The method defined in claim 32, wherein said attempting to re-deliver said request comprises at least one of:
delivering said request to said plurality of communication clients;
routing said request to a voicemail system.

34. The method defined in claim 31, wherein said determining if said delivering is successfully comprises recognizing that said communication session is established.

35. The method defined in claim 1, wherein said subset of said plurality of communication clients comprises at least two communication clients; and wherein the method further comprises:
announcing to said originating party a respective identifier of said at least two communication clients;
soliciting from said originating party an auxiliary delivery instruction; and wherein said delivering said request comprises delivering said request in accordance with said auxiliary delivery instruction.

36. The method defined in claim 35, wherein said auxiliary delivery instruction is indicative of which one of said at least two communication clients to deliver said request to.

37. The method defined in claim 1, said subset comprising a first subset, wherein said second identifying further comprises identifying a second subset of said plurality of communication clients, and wherein the method further comprises:
announcing to said originating party an identifier of said first and second subsets;
soliciting from said originating party an auxiliary delivery instruction, and wherein said delivering said request comprises delivering said request in accordance with said auxiliary delivery instruction.

38. The method defined in claim 37, wherein said auxiliary delivery instruction is indicative of which one of said first and second subset to deliver said request to.

39. The method defined in claim 1, said subset comprising a first subset, wherein said second identifying further comprises identifying a second subset of said plurality of communication clients, and wherein the method further comprises:
retrieving (i) a first delivery parameter associated with said first subset and (ii) a second delivery parameter associated with said second subset, and wherein said delivering said request comprises:
delivering said request to said first subset if said first delivery parameter is satisfied; and
delivering said request to said second subset if said second delivery parameter is satisfied.

40. The method defined in claim 1, wherein, if any given one of said plurality of communication clients has been provisioned as a default communication client, said delivering said request further comprises:
delivering said request to said given one of said plurality of communication clients.

41. The method defined in claim 1, wherein said request for a communication session comprises signalling information used for establishing said communication session.

42. The method defined in claim 41, wherein said signalling information comprises a SIP INVITE message.

43. The method defined in claim 1, wherein when said originating identifier is not capable of being determined, the method comprises delivering said request to each of said plurality of communication clients.

44. A system comprising:
a network element operable to
receive, at a processing time, a request for a communication session, said request comprising a destination network identifier, said request having been originated by an originating party associated with an originating identifier;
first identify, based on the destination network identifier, a plurality of communication clients registered to the destination network identifier;
second identify, based on at least one of said originating identifier and said processing time, a subset of at least two of communication clients among the plurality of communication clients identified as being registered to the destination network identifier;
deliver said request to each communication client in said subset of said plurality of communication clients.

45. The system defined in claim 44, wherein to second identify said subset of said plurality of communication clients, the network element is operable to identify said subset of said plurality of communication clients based on said originating identifier.

46. The system defined in claim 44, wherein to second identify said subset of said plurality of communication clients, the network element is operable to identify said subset of said plurality of communication clients based on said processing time.

47. The system defined in claim 44, wherein to second identify said subset of said plurality of communication clients, the network element is operable to identify said subset of said plurality of communication clients based on both said originating identifier and said processing time.

48. The system defined in claim 44, wherein the network element is further operable:
to access a database that maps at least one network identifier associated to at least one registered client with at least one corresponding delivery parameter;
if said destination network identifier corresponds to at least one of said at least one network identifier associated with at least one registered client, to retrieve said at least one corresponding delivery parameter.

49. The system defined in claim 48, wherein to second identify said subset, the network element is further operable, if said at least one corresponding delivery parameter is satisfied, to determine that said at least one registered client is within said subset of said plurality of communication clients.

50. The system defined in claim 49, wherein said at least one corresponding delivery parameter comprises an indication of at least one originating identifier.

51. The system defined in claim 50, wherein the network element is further operable to determine that said at least one corresponding delivery parameter is satisfied, if said originating identifier corresponds to said indication of at least one originating identifier.

52. The system defined in claim 50, wherein said indication of at least one originating identifier comprises at least one of:
an indication of an allowed network identifier; and
an indication of a disallowed network identifier.

53. The system defined in claim 49, wherein said at least one corresponding delivery parameter comprises an indication of a time interval.

54. The system defined in claim 53, wherein the network element is further operable to determine that said at least one corresponding delivery parameter is satisfied, if said processing time falls within said time interval.

55. The system defined in claim 54, wherein the network element is further operable to determine that said at least one corresponding delivery parameter is satisfied, if said processing time falls outside of said time interval.

56. The system defined in claim 49, wherein said at least one corresponding delivery parameter comprises a combination of an indication of at least one originating identifier and an indication of a time interval.

57. The system defined in claim 56, wherein the network element is further operable to determine that said at least one corresponding delivery parameter is satisfied if (i) said originating identifier corresponds to said indication of at least one originating identifier, and (ii) said processing time falls within said time interval.

58. The system defined in claim 48, wherein said at least one delivery parameter comprises retrieving a first delivery parameter associated with a first communication client within said plurality of communication clients and a second delivery parameter associated with a second communication client within said plurality of communication clients, and wherein the network element is further operable to verify if said first delivery parameter and said second delivery parameter are satisfied.

59. The system defined in claim 58, wherein to second identify said subset of said plurality of communication clients, the network element is operable:
to determine that said first communication client is within said subset if said first delivery parameter is satisfied; and
to determine that said second communication client is within said subset if said second delivery parameter is satisfied.

60. The system defined in claim 58, wherein if it is determined that said first delivery parameter is satisfied, the network element is operable to determine that only said first communication client belongs to said subset irrespective of whether said second delivery parameter is satisfied.

61. The system defined in claim 48, further comprising said database.

62. The system defined in claim 48, wherein said network element comprises said database.

63. The system defined in claim 44, wherein the network element is further operable:
to access a first database that maps at least one network identifier to an indication of a subscription to an incoming call handling feature;
responsive to said destination network identifier corresponding to said at least one network identifier, to determine that said destination network identifier has been provisioned with the incoming call handling feature;
to access a second database that maps at least one network identifier to at least one corresponding delivery parameter,
based on said destination network identifier, to retrieve from said second database said at least one corresponding delivery parameter to be applied to said communication session.

64. The system defined in claim 63, wherein to identify said subset, the network element is further operable, if said at least one corresponding delivery parameter is satisfied, to determine that said at least one registered client is within said subset of said plurality of communication clients.

65. The system defined in claim 64, wherein said at least one corresponding delivery parameter comprises an indication of at least one originating identifier.

66. The system defined in claim 65, wherein the network element is further operable to determine that said at least one corresponding delivery parameter is satisfied, if said originating identifier corresponds to said indication of at least one originating identifier.

67. The system defined in claim 65, wherein said indication of at least one originating identifier comprises at least one of:
an indication of an allowed network identifier; and
an indication of a disallowed network identifier.

68. The system defined in claim 64, wherein said at least one corresponding delivery parameter comprises an indication of a time interval.

69. The system defined in claim 68, wherein the network element is further operable to determine that said at least one corresponding delivery parameter is satisfied, if said processing time falls within said time interval.

70. The system defined in claim 69, wherein the network element is further operable to determine that said at least one corresponding delivery parameter is satisfied, if said processing time falls outside of said time interval.

71. The system defined in claim 63, wherein said at least one corresponding delivery parameter comprises a combination of an indication of at least one originating identifier and an indication of a time interval.

72. The system defined in claim 71, wherein the network element is further operable to determine that said at least one corresponding delivery parameter is satisfied if (i) said originating identifier corresponds to said indication of at least one originating identifier; and (ii) said processing time falls within said time interval.

73. The system defined in claim 63, wherein said at least one delivery parameter comprises retrieving a first delivery parameter associated with a first communication client within said plurality of communication clients and a second delivery parameter associated with a second communication client within said plurality of communication clients, and wherein the network element is further operable to verify if said first delivery parameter and said second delivery parameter are satisfied.

74. The system defined in claim 73, wherein to second identify said subset of said plurality of communication clients, the network element is operable:
to determine that said first communication client is within said subset if said first delivery parameter is satisfied; and
to determine that said second communication client is within said subset if said second delivery parameter is satisfied.

75. The system defined in claim 73, wherein if it is determined that said first delivery parameter is satisfied, the network element is operable to determine that only said first communication client belongs to said subset irrespective of whether said second delivery parameter is satisfied.

76. The system defined in claim 63, wherein said network element comprises said first database.

77. The system defined in claim 76, further comprising said second database.

78. The system defined in claim 44, wherein the network element is further operable to determine if said request is delivered successfully.

79. The system defined in claim 78, wherein the network element is further operable, if said request is not delivered successfully, to attempt to re-deliver said request.

80. The system defined in claim 79, wherein to attempt to re-deliver said request, the network element is operable to:
deliver said request to said plurality of communication clients;
route said request to a voicemail system.

81. The system defined in claim 78, wherein to determine if said request is delivered successfully, the network element is operable to recognize that said communication session is established.

82. The system defined in claim 44, wherein said subset of said plurality of communication clients comprises at least two communication clients; and wherein the network element is further operable to:
announce to said originating party a respective identifier of said at least two communication clients;
solicit from said originating party an auxiliary delivery instruction, and wherein to deliver said request, the network element is operable to deliver said request in accordance with said auxiliary delivery instruction.

83. The system defined in claim 82, wherein said auxiliary delivery instruction is indicative of which one of said at least two communication clients to deliver said request to.

84. The system defined in claim 44, said subset comprising a first subset, wherein to second identify said subset, the network element is further operable to identify a second subset of said plurality of communication clients, and wherein the network element is further operable:
to announce to said originating party an identifier of said first and second subsets;
to solicit from said originating party an auxiliary delivery instruction and wherein to deliver said request, the network element is operable to deliver said request in accordance with said auxiliary delivery instruction.

85. The system defined in claim 84, wherein said auxiliary delivery instruction is indicative of which one of said at least two communication clients to deliver said request to.

86. The system defined in claim 44, said subset comprising a first subset, wherein to second identify said subset, the network element is further operable to identify a second subset of said plurality of communication clients, and wherein the network element is further operable:
to retrieve (i) a first delivery parameter associated with said first subset and (ii) a second delivery parameter associated with said second subset, and wherein to deliver said request, the network element is operable:
to deliver said request to said first subset if said first delivery parameter is satisfied; and
to deliver said request to said second subset if said second delivery parameter is satisfied.

87. The system defined in claim 44, wherein the network element is further operable, if any given one of said plurality of communication clients have been provisioned as a default communication client, to deliver said request to said given one of said plurality of communication clients.

88. The system defined in claim 44, wherein said request for a communication session comprises signalling information used for establishing said communication session.

89. The system defined in claim 88, wherein said signalling information comprises a SIP INVITE message.

90. The system defined in claim 44, wherein when said originating identifier is not capable of being determined, the network element is operable to deliver said request to each of said plurality of communication clients.

91. A non-transitory computer-readable medium comprising computer-readable program code which, when executed by a computing apparatus, causes the computing apparatus to:
receive, at a processing time, a request for a communication session, said request comprising a destination network identifier, said request having been originated by an originating party associated with an originating identifier;
identify, based on the destination network identifier, a plurality of communication clients registered to the destination network identifier;
identify, based on at least one of said originating identifier and said processing time, a subset of at least two communication clients among the plurality of communication clients identified as being registered to the destination network identifier;
deliver said request to each communication client in said subset of said plurality of communication clients.

92. The non-transitory computer-readable medium defined in claim 91, wherein the computer-readable program code is such that the computing apparatus is caused to deliver said request to each of said plurality of communication clients when said originating identifier is not capable of being determined.

* * * * *